United States Patent
Iacono et al.

(10) Patent No.: US 7,079,843 B2
(45) Date of Patent: Jul. 18, 2006

(54) METHOD AND APPARATUS FOR SUPPORTING A SOFT HANDOFF BY ESTABLISHING A CELL SET USED TO FACILITATE ANTENNA BEAM MODE TRANSITIONS IN A MOBILE STATION

(75) Inventors: Ana Lucia Iacono, Garden City, NY (US); Timothy A. Axness, Collegeville, PA (US); Kevin Peter Johnson, Palm Bay, FL (US); Thomas Eric Gorsuch, Merritt Island, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/948,900

(22) Filed: Sep. 24, 2004

(65) Prior Publication Data

US 2005/0136929 A1 Jun. 23, 2005

Related U.S. Application Data

(60) Provisional application No. 60/532,015, filed on Dec. 23, 2003.

(51) Int. Cl.
*H04Q 7/20* (2006.01)
*H04B 1/00* (2006.01)
*H04B 15/00* (2006.01)
*H04M 1/00* (2006.01)

(52) U.S. Cl. .................... 455/437; 455/436; 455/439; 455/63.4; 455/562.1

(58) Field of Classification Search ............ 455/436, 455/435.1, 435.2, 437, 439, 67.11, 63.4, 562.1
See application file for complete search history.

(56) References Cited

U.S. PATENT DOCUMENTS

| 5,594,943 | A  | * | 1/1997 | Balachandran ............... 455/436 |
| 6,049,715 | A  | * | 4/2000 | Willhoff et al. ............. 455/436 |
| 6,549,787 | B1 | * | 4/2003 | Ravi .......................... 455/525 |
| 6,697,642 | B1 | * | 2/2004 | Thomas .................... 455/562.1 |
| 6,842,616 | B1 | * | 1/2005 | Takano et al. ........... 455/435.2 |
| 2002/0049058 | A1 | * | 4/2002 | Tee ............................ 455/437 |
| 2002/0137538 | A1 | * | 9/2002 | Chen et al. ................. 455/550 |
| 2003/0203735 | A1 | * | 10/2003 | Andrus et al. ............. 455/450 |
| 2004/0157583 | A1 | * | 8/2004 | Matsumoto ................. 455/410 |
| 2004/0266393 | A1 | * | 12/2004 | Zhao et al. ................. 455/407 |

* cited by examiner

*Primary Examiner*—Jean Gelin
(74) *Attorney, Agent, or Firm*—Volpe and Koenig, P.C.

(57) ABSTRACT

A method and apparatus for establishing a set of cells used to support a soft handoff. The apparatus is used in a wireless communication system including a plurality of cells and at least one wireless transmit/receive unit (WTRU) having at least one beam antenna which is configured to transition between a switch beam mode and an omni-directional beam mode. The WTRU communicates with a serving cell while the beam antenna is in the switch beam mode. The WTRU performs measurements on cells neighboring the serving cell to determine measurement results associated with the cells. The WTRU then determines whether each of the measurement results exceeds a predetermined threshold. A set of cells associated with the measurement results that exceed the predetermined threshold is established. If the number of cells in the set reaches a predetermined number, the beam antenna transitions from the switch beam mode to the omni-directional beam mode.

15 Claims, 2 Drawing Sheets

METHOD AND APPARATUS FOR SUPPORTING A SOFT HANDOFF BY ESTABLISHING A CELL SET USED TO FACILITATE ANTENNA BEAM MODE TRANSITIONS IN A MOBILE STATION

CROSS REFERENCE TO RELATED APPLICATION

This application claims the benefit of U.S. Provisional Patent Application Ser. No. 60/532,015 filed Dec. 23, 2003, which is incorporated by reference as if fully set forth.

FIELD OF INVENTION

The present invention is related to wireless communications. More particularly, the present invention is related to a method and apparatus for supporting a soft handoff for a wireless transmit/receive unit (WTRU), (i.e., mobile station), that uses an antenna array with a switch beam mode and an omni-directional beam mode.

BACKGROUND

In a wireless multi-cell communication system, a WTRU is allowed to move from one cell to another. As the WTRU crosses the boundary of a cell, a handoff is initiated. A soft handoff is a procedure for which communication in one cell is transferred to another cell without interruption. During soft handoff, the same data is received and transmitted between at least two cells.

In order to support soft handoff, the WTRU performs physical measurements on the signals received from a current serving cell and neighboring cells, and reports the measurements to a network upon the occurrence of one or more triggering events. More than one threshold may be established for measurement reporting, depending on the requirements of the system.

For example, in a code division multiple access 2000 (CDMA2000) system, a WTRU measures the strength of pilot signals transmitted by a serving cell and neighboring cells. If the pilot signal strength of any of the cells exceeds a predetermined threshold, the WTRU reports the measurement results to the network when the strength of a neighbor pilot exceeds a predetermined pilot detection threshold, T_ADD, or when the strength of a neighbor pilot exceeds the strength of the pilot of the serving cell by 0.5×T_COMP dB, where T_COMP is a comparison threshold. Based on the measurement results reported by the WTRU, the network decides whether or not to assign a channel to the WTRU in a target cell.

The thresholds used for measurement reporting (e.g., T_ADD and/or T_COMP) are usually established under the assumption that the WTRU uses an omni-directional antenna, instead of a switch antenna. A switch antenna (i.e., a smart antenna), generates a narrow beam which advantageously increases the signal-to-interference ratio (SIR) in a wireless communication system. However, when the WTRU uses a switch antenna to communicate with a serving base station, the antenna steers to a particular direction, and therefore, the physical measurements on the signals from neighboring cells may be affected by the antenna direction.

FIG. 1 shows a conventional system 100 including a WTRU 102 utilizing a switch beam 106 in communication with a serving cell including a base station (BS) 104a. Since the gain of the switch beam 106 is directed to a particular direction, the signals from neighboring cells (BSs 104b) may not be properly detected even if the neighboring cells are closer than the serving cell.

The received signal power from neighboring cells may be too low in amplitude to trigger the transmission of a measurement report to the network. Thus, a soft handoff may not be triggered which could lead to a higher rate of hard handoffs and increase the number of dropped calls.

SUMMARY

The present invention is a method and apparatus used to establish a set of cells used for a soft handoff. The apparatus is used in a wireless communication system including a plurality of cells and at least one WTRU having at least one beam antenna which is configured to transition between a switch beam mode and an omni-directional beam mode. The WTRU communicates with a serving cell while the beam antenna is in the switch beam mode. The WTRU performs at least one measurement on signals received from cells neighboring the serving cell to determine measurement results associated with the cells. The WTRU then determines whether each of the measurement results exceeds a predetermined threshold. A set of cells associated with the measurement results that exceed the predetermined threshold is established. If the number of cells in the set reaches a predetermined number, the beam antenna transitions from the switch beam mode to the omni-directional beam mode.

The WTRU may determine whether or not a cell handoff is occurring. All of the cells from the set may be removed after the completion of a cell handoff and the entire process is repeated.

Upon the beam antenna transitioning to the omni-directional beam mode, a timer may be activated and the WTRU determines whether or not a cell handoff is occurring. If the timer expires before the occurrence of a cell handoff, all of the cells from the set and the entire process is repeated.

A particular cell may be removed from the set if a measurement result associated with the particular cell does not exceed the predetermined threshold. The signals are pilot signals transmitted by the neighboring cells.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
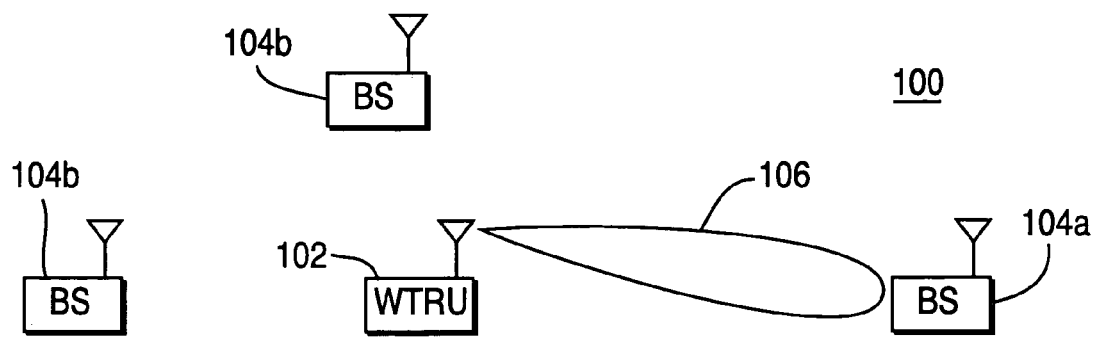
FIG. 1 shows a conventional wireless communication system including a WTRU operating in a switch beam mode.

The present invention will be described with reference to the drawing figures wherein like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment.

When referred to hereafter, the terminology "base station" includes but is not limited to a Node-B, a site controller, an access point or any other type of interfacing device in a wireless environment.

The present invention may be further applicable to time division duplex (TDD), frequency division duplex (FDD), and time division synchronous code division multiple access (TD-SCDMA), as applied to universal mobile telecommunications system (UMTS), CDMA 2000 and CDMA in general, but is envisaged to be applicable to other wireless systems as well.

The features of the present invention may be incorporated into an integrated circuit (IC) or be configured in a circuit comprising a multitude of interconnecting components.

Figure 2:
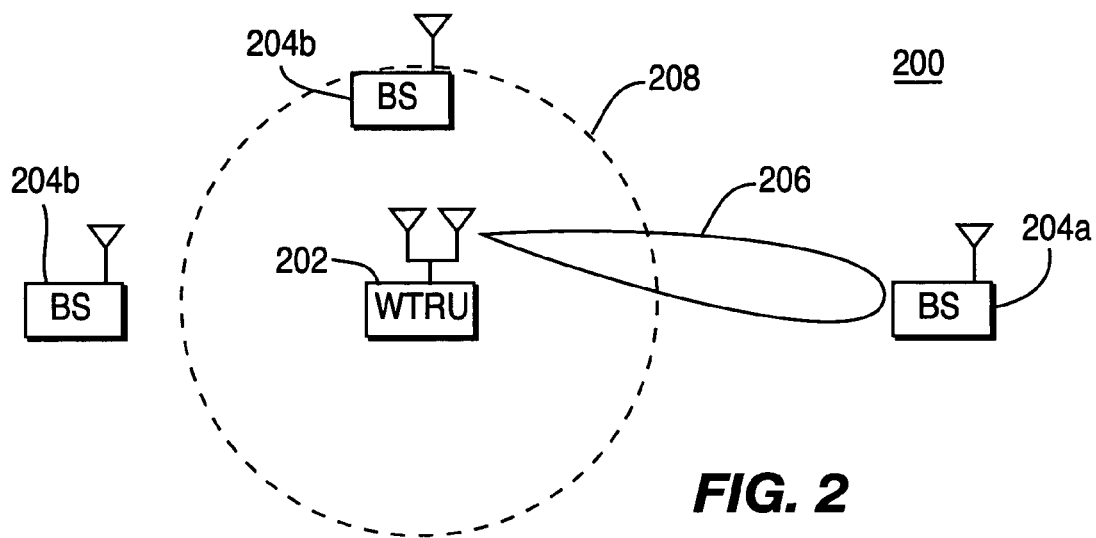
FIG. 2 shows a WTRU configured to switch between a switch beam mode and an omni-directional beam mode in accordance with the present invention.

FIG. 2 shows a system 200 including a WTRU 202 configured to transition between a switch beam mode and an omni-directional beam mode in accordance with the present invention. The WTRU 202 is configured to selectively generate either a switch beam 206 or an omni-directional beam 208. The switch beam 206 is used for communicating with a serving cell (BS 204a) before or after handoff. The omni-directional beam 208 is used for the purpose of handoff, including detection of a handoff triggering event, by measuring signals transmitted from neighboring cells (BSs 204b).

Figure 3:
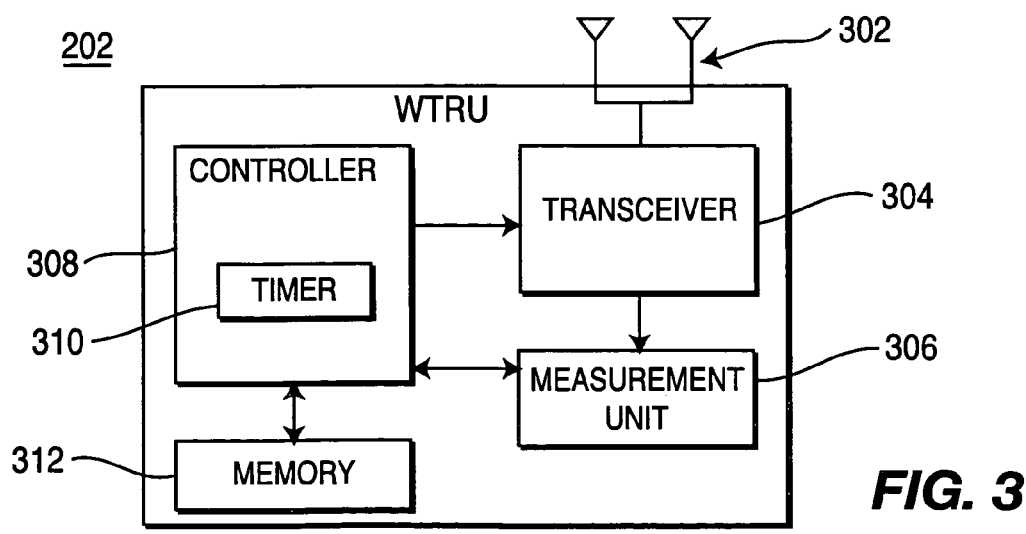
FIG. 3 is an exemplary block diagram of the WTRU of FIG. 2.

FIG. 3 is an exemplary block diagram of the WTRU 202 used in system 200. The WTRU 202 includes an antenna array 302, a transceiver 304, a measurement unit 306, a controller 308 including a timer 310, and a memory 312. It should be understood that the timer 310 may alternatively be a stand-alone component separate from the controller 308. The antenna array 302 includes one or more antennas and is configured to generate both the switch beam 206 and the omni-directional beam 208 under the control of the controller 308. More than one switch beam 206 may be generated and used for communication during handoff. The antenna array 302 may comprise two separate units for generating each of the switch beam 206 and the omni-directional beam 208. The transceiver receives signals from the antenna array 302 and forwards them to the measurement unit 306 which performs physical measurements on the received signals. Pilot signals are preferably used for the measurements. However, any other signals transmitted from the cells (i.e., BSs) may be used for this purpose. The memory 312 stores threshold values used for comparison with the physical measurements. The threshold values are parameters configurable by the network operator, and may be set through a wireless connection under the control of the controller 308. The controller 308 performs the comparison, controls the beam configuration of the antenna array 302 and controls the transceiver 304 to transmit a request for handoff, as required.

Figure 4:
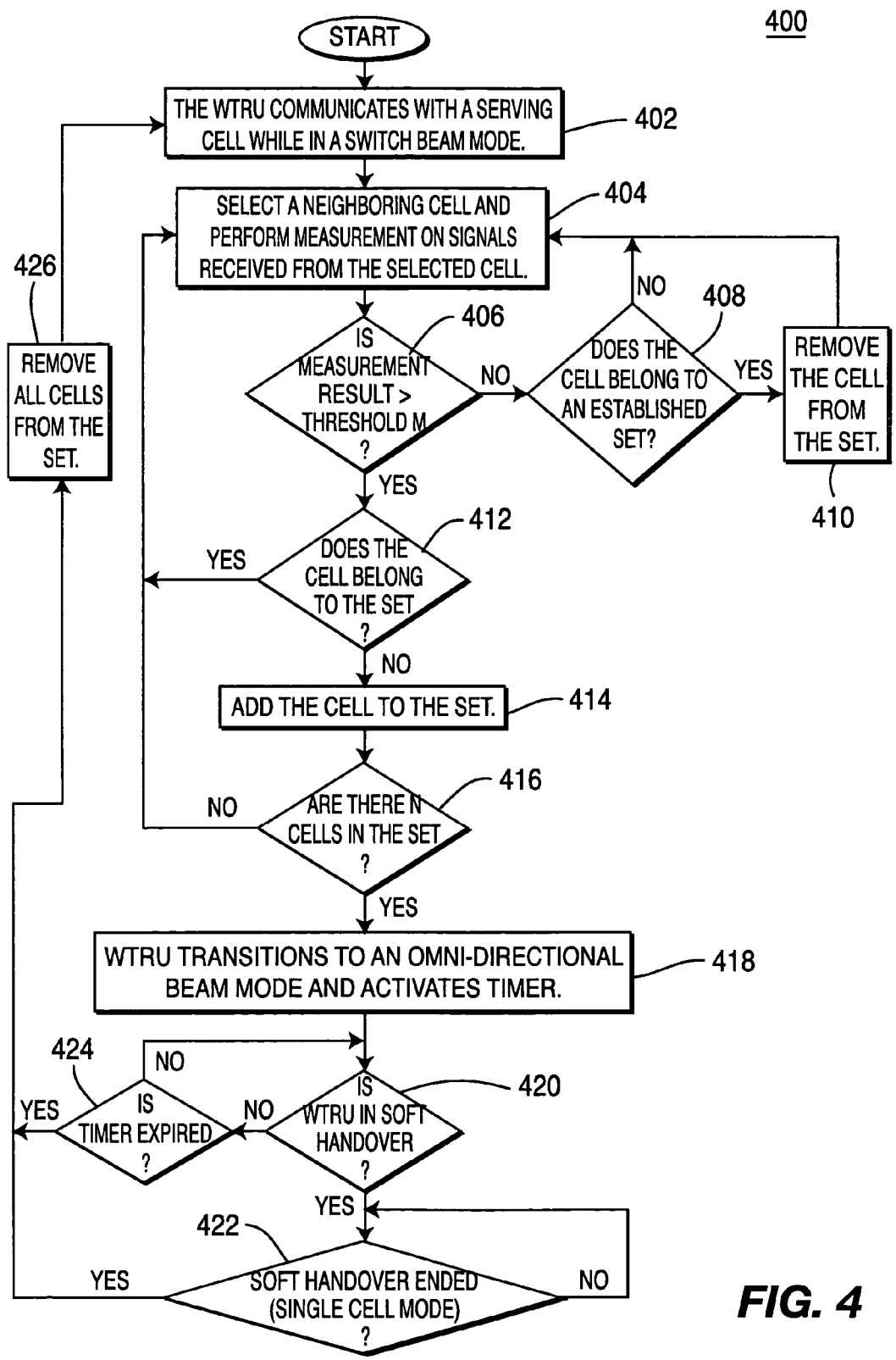
FIG. 4 is a flowchart of a process including method steps for controlling the WTRU of FIG. 3.

FIG. 4 is a flowchart of a process 400 including method steps for controlling the WTRU 202 in accordance with the present invention. Referring also to FIG. 2, the WTRU 202 initially communicates with a serving cell (BS 204a) while in a switch beam mode (step 402). The WTRU 202 is configured to generate both a switch beam 206 and an omni-directional beam 208. In normal operation (i.e., in a default condition), the WTRU 202 operates in the switch beam mode to communicate with the serving cell whereby the switch beam 206 emitted from the antenna array 302 of the WTRU 202 is directed toward a particular direction.

The WTRU 202 maintains a set of cells for handoff, whereby cells are dynamically added and removed from the set in accordance with the quality of signals received from the cells. In order to maintain the set of cells, the WTRU 202 constantly monitors and performs at least one physical measurement on signals received by the WTRU 202 from selected neighboring cells (BSs 204b) while in communication with the serving cell (BS 204a) (step 404). In step 406, the WTRU 202 determines whether or not the measurement result of each neighboring cell's signals is above a predetermined threshold M. If the measurement result of the neighboring cell signal is not above the threshold M and the neighboring cell is already included in an established cell set, as determined in step 408, the cell is removed from the set (step 410) and the process 400 returns to step 404 such that another neighboring cell may be analyzed. If the measurement result on signals from a particular cell is greater than the threshold M, the WTRU 202 determines whether or not the selected neighboring cell belongs to the set (step 412) and, if so, the process returns to step 404. If the WTRU determines that the selected neighboring cell does not belong to an established set, the WTRU 202 adds the cell to the set (step 414).

Still referring to FIG. 4, the WTRU 202 determines whether the number of cells in the set exceeds a predetermined number N (step 416). N is a parameter set by the network operator. If the number of cells in the set as determined in step 416 does not exceed N, the process 400 returns to step 404. If the number of cells in the set as determined in step 416 is N, the WTRU 202 switches to the omni-directional beam mode for detecting an occurrence of a handoff triggering event and sets and activates the timer 310 for a predetermined duration T in the controller 308 of the WTRU 202 (step 418).

Still referring to FIG. 4, in step 420, a determination is made as to whether or not the WTRU 202 is involved in a soft handoff. If a soft handoff is determined to be in progress at the WTRU 202 in step 420, and it is determined to be completed in step 422, the WTRU 202 removes all cells from the set in step 426. The process 400 then returns to step 402 where the WTRU transitions back to the switch beam mode to communicate to a new serving cell with the switch beam 206. If it is determined that the handoff is not in progress at step 420, the WTRU 202 determines whether the timer 310 expired (step 424). If the timer 310 expires in step 424, the WTRU 202 removes all cells from the set (step 426) and the process 400 returns to step 402.

The threshold M, the timer duration T, and the number of cells N are design parameters set by a wireless network operator. These parameters are set based on a tradeoff between the gain provided by the soft handoff and the gain provided by beam switching in accordance with the present invention.

Large values for the timer duration T favors soft handoff. Small values of the timer duration T favors operation in the switch beam mode. This is because the smaller the value of the timer duration T, the faster the WTRU 202 will return to a switch beam mode. Similarly, small values for N and M favors soft handoff, the WTRU 202 transitions to the omni-directional beam mode faster and soft handoff is more likely to happen. Large values of N and M favors a switch beam mode because the WTRU 202 will remain in a switch beam mode for a longer period of time.

The threshold M may be a fixed number, or a function of measurements, (i.e. measurement thresholds, such as T_ADD and/or T_COMP). The threshold M may also be a function of the signal strength of the serving cell that the WTRU 202 is currently connected to and the radiation pattern of the antenna array 302 (e.g., the front to back ratio of the antenna). A combination of all of the above could also be used.

While this invention has been particularly shown and described with reference to preferred embodiments, it will be understood by those skilled in the art that various changes in form and details may be made therein without departing from the scope of the invention described hereinabove.

What is claimed is:

1. In a wireless communication system including a plurality of cells and at least one wireless transmit/receive unit (WTRU) having at least one beam antenna which is configured to transition between a switch beam mode and an omni-directional beam mode, a method comprising:
   (a) the WTRU communicating with a serving cell while the beam antenna is in the switch beam mode;
   (b) the WTRU performing at least one measurement on signals received from cells neighboring the serving cell to determine measurement results associated with the cells;
   (c) the WTRU determining whether each of the measurement results exceeds at least one predetermined threshold;
   (d) establishing a set of cells associated with the measurement results that exceed the at least one predetermined threshold; and
   (e) if the WTRU determines that the number of cells in the set reaches a predetermined number set by an operator of the system, transitioning the beam antenna in the WTRU from the switch beam mode to the omni-directional beam mode.

2. The method of claim 1 further comprising:
   (f) the WTRU determining whether or not a cell handoff is occurring;
   (g) removing all of the cells from the set after the completion of a cell handoff; and
   (h) repeating steps (a)–(g).

3. The method of claim 1 further comprising:
   (f) activating a timer when the beam antenna transitions from the switch beam mode to the omni-directional beam mode;
   (g) the WTRU determining whether or not a cell handoff is occurring;
   (h) if the timer expires before the occurrence of a cell handoff, removing all of the cells from the set; and
   (i) repeating steps (a)–(h).

4. The method of claim 1 wherein step (d) further comprises removing a particular cell from the set if a measurement result associated with the particular cell does not exceed the predetermined threshold.

5. The method of claim 1 wherein the received signals are pilot signals transmitted by the neighboring cells.

6. In a wireless communication system including a plurality of cells, a wireless transmit/receive unit (WTRU) comprising:
   (a) at least one beam antenna which is configured to transition between a switch beam mode and an omni-directional beam mode;
   (b) means for communicating with a serving cell while the beam antenna is in the switch beam mode;
   (c) means for performing at least one measurement on signals received from cells neighboring the serving cell to determine measurement results associated with the cells;
   (d) means for determining whether each of the measurement results exceeds at least one predetermined threshold;
   (e) means for establishing a set of cells associated with the measurement results that exceed the at least one predetermined threshold; and
   (f) means for transitioning the beam antenna in the WTRU from the switch beam mode to the omni-directional beam mode if the WTRU determines that the number of cells in the set reaches a predetermined number set by an operator of the system.

7. The WTRU of claim 6 further comprising:
   (g) means for determining whether or not a cell handoff is occurring;
   (h) means for removing all of the cells from the set after the completion of a cell handoff; and
   (i) means for transitioning the beam antenna in the WTRU from the omni-directional beam mode to the switch beam mode if step (h) is implemented.

8. The WTRU of claim 6 further comprising:
   (g) a timer which activates when the beam antenna in the WTRU transitions from the switch beam mode to the omni-directional beam mode;
   (h) means for determining whether or not a cell handoff is occurring;
   (i) means for removing all of the cells from the set if the timer expires before the occurrence of a cell handoff; and
   (j) means for transitioning the beam antenna in the WTRU from the omni-directional beam mode to the switch beam mode after all of the cells are removed from the set.

9. The WTRU of claim 6 further comprising:
   (g) means for removing a particular cell from the set if a measurement result associated with the particular cell does not exceed the predetermined threshold.

10. The WTRU of claim 6 wherein the received signals are pilot signals transmitted by the neighboring cells.

11. In a wireless communication system including a plurality of cells and at least one wireless transmit/receive unit (WTRU) having at least one beam antenna which is configured to transition between a switch beam mode and an omni-directional beam mode, an integrated circuit (IC) used in conjunction with the WTRU, the IC comprising:
    (a) means for communicating with a serving cell while the beam antenna is in the switch beam mode;
    (b) means for performing at least one measurement on signals received from cells neighboring the serving cell to determine measurement results associated with the cells;
    (c) means for determining whether each of the measurement results exceeds at least one predetermined threshold;
    (d) means for establishing a set of cells associated with the measurement results that exceed the at least one predetermined threshold; and
    (e) means for transitioning the beam antenna in the WTRU from the switch beam mode to an omni-directional beam mode if the WTRU determines that the number of cells in the set reaches a predetermined number set by an operator of the system.

12. The IC of claim 11 further comprising:
    (f) means for determining whether or not a cell handoff is occurring;
    (g) means for removing all of the cells from the set after the completion of a cell handoff; and
    (h) means for transitioning the beam antenna in the WTRU from the omni-directional beam mode to the switch beam mode after all of the cells are removed from the set.

13. The IC of claim 11 further comprising:
(f) a timer which activates when the beam antenna in the WTRU transitions from the switch beam mode to the omni-directional beam mode;
(g) means for determining whether or not a cell handoff is occurring;
(h) means for removing all of the cells from the set if the timer expires before the occurrence of a cell handoff; and
(i) means for transitioning the beam antenna in the WTRU from the omni-directional beam mode to the switch beam mode after all of the cells are removed from the set.

14. The IC of claim 11 further comprising:
(f) means for removing a particular cell from the set if a measurement result associated with the particular cell does not exceed the predetermined threshold.

15. The IC of claim 11 wherein the received signals are pilot signals transmitted by the neighboring cells.

* * * * *